US011965840B2

(12) United States Patent
Deerinck et al.

(10) Patent No.: US 11,965,840 B2
(45) Date of Patent: Apr. 23, 2024

(54) CHARGE-RESISTANT EPOXY RESINS FOR ELECTRON MICROSCOPY APPLICATIONS

(71) Applicant: The Regents of the University of California, Oakland, CA (US)

(72) Inventors: Thomas Deerinck, La Jolla, CA (US); Mark Ellisman, La Jolla, CA (US); Steven Peltier, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 449 days.

(21) Appl. No.: 17/238,530

(22) Filed: Apr. 23, 2021

(65) Prior Publication Data
US 2021/0333177 A1    Oct. 28, 2021

Related U.S. Application Data

(60) Provisional application No. 63/014,865, filed on Apr. 24, 2020.

(51) Int. Cl.
*G01N 23/2251* (2018.01)
*C08K 3/22* (2006.01)
(Continued)

(52) U.S. Cl.
CPC .......... *G01N 23/2251* (2013.01); *C08K 3/22* (2013.01); *C08K 5/06* (2013.01); *C08L 63/00* (2013.01);
(Continued)

(58) Field of Classification Search
CPC ................ G01N 23/2251; G01N 1/36; G01N 2001/364; G01N 1/30; C08K 3/22;
(Continued)

(56) References Cited

U.S. PATENT DOCUMENTS

2014/0212913 A1* 7/2014 Ohta ................. H01J 37/26
  250/307
2016/0123855 A1* 5/2016 Friedrich ............ B22F 1/17
  427/58

(Continued)

OTHER PUBLICATIONS

Nguyen HB, Thai TQ, Sui Y, Azuma M, Fujiwara K, Ohno N. Methodological Improvements With Conductive Materials for Volume Imaging of Neural Circuits by Electron Microscopy. Front Neural Circuits. Nov. 23, 2018;12:108. doi: 10.3389/fncir.2018. 00108. PMID: 30532696; PMCID: PMC6265348. (Year: 2018).*

(Continued)

*Primary Examiner* — David E Smith
*Assistant Examiner* — Christopher J Gassen
(74) *Attorney, Agent, or Firm* — Greer, Burns & Crain, Ltd.; Steven P. Fallon

(57) ABSTRACT

An epoxy resin-based embedding media doped with a non-conductive dopant to a predetermined w/w % such that the media is non-charging at 1.8 keV. A preferred dopant is polyethylene glycol at a molecular weight of at least 3350, and having a predetermined w/w % is at least 2% and up to 20%, most preferably from 2% to 10%. Another preferred dopant is polyethylene glycol at a molecular weight of 7000-8000 and a predetermined w/w % of up to ~40% and more preferably of up to ~30%.

10 Claims, 5 Drawing Sheets

(51) Int. Cl.
*C08K 5/06* (2006.01)
*C08L 63/00* (2006.01)
*G01N 1/36* (2006.01)

(52) U.S. Cl.
CPC .......... *G01N 1/36* (2013.01); *C08K 2003/222* (2013.01); *G01N 2001/364* (2013.01)

(58) Field of Classification Search
CPC ..... C08K 5/06; C08K 2003/222; C08L 63/00; C09J 163/00; C09J 171/02
See application file for complete search history.

(56) References Cited

U.S. PATENT DOCUMENTS

2016/0163505 A1* 6/2016 Ellisman ................. H01B 1/12
252/511
2020/0373121 A1* 11/2020 Rosa-Molinar .......... G01N 1/36

OTHER PUBLICATIONS

He Q, Hsueh M, Zhang G, Joy DC, Leapman RD. Biological serial block face scanning electron microscopy at improved z-resolution based on Monte Carlo model. Sci Rep. Aug. 28, 2018;8(1):12985. doi: 10.1038/s41598-018-31231-w. PMID: 30154532; PMCID: PMC6113311. (Year: 2018).*

Deerinck et al., "Enhancing Serial Block-Face Scanning Electron Microscopy to Enable High Resolution 3-D Nanohistology of Cells and Tissues", Microscopy and Microanalysis, 2010, pp. 1138-1139, vol. 16, Suppl. 2, Microscopy Society of America.

Deerinck et al., "High-performance serial block-face SEM of nonconductive biological samples enabled by focal gas injection-based charge compensation", Journal of Microscopy, 2018, pp. 142-149, vol. 270, No. 2, Royal Microscopical Society.

Nguyen et al., "Conductive resins improve charging and resolution of acquired images in electron microscopic volume imaging", Scientific Reports, 2016, pp. 1-10, vol. 6, No. 23721, Nature.

Tang et al., "Quantitative Measurements of Charging in a Gaseous Environment", Scanning, 2003, pp. 194-200, vol. 25, No. 4, FAMS, Inc.

Titze et al., "Automated in-chamber specimen coating for serial block-face electron microscopy", Journal of Microscopy, 2013, pp. 101-110, vol. 250, Pt. 2, Royal Microscopical Society.

Wanner et al., "Dense EM-based reconstruction of the interglomerular projectome in the zebrafish olfactory bulb", Nature Neuroscience, 2016, pp. 816-828, vol. 19, No. 6, Nature America, Inc.

Wolosewick et al., "The Application of Polyethylene Glycol (PEG) to Electron Microscopy", The Journal of Cell Biology, 1980, pp. 675-681, vol. 86, The Rockefeller University Press.

* cited by examiner

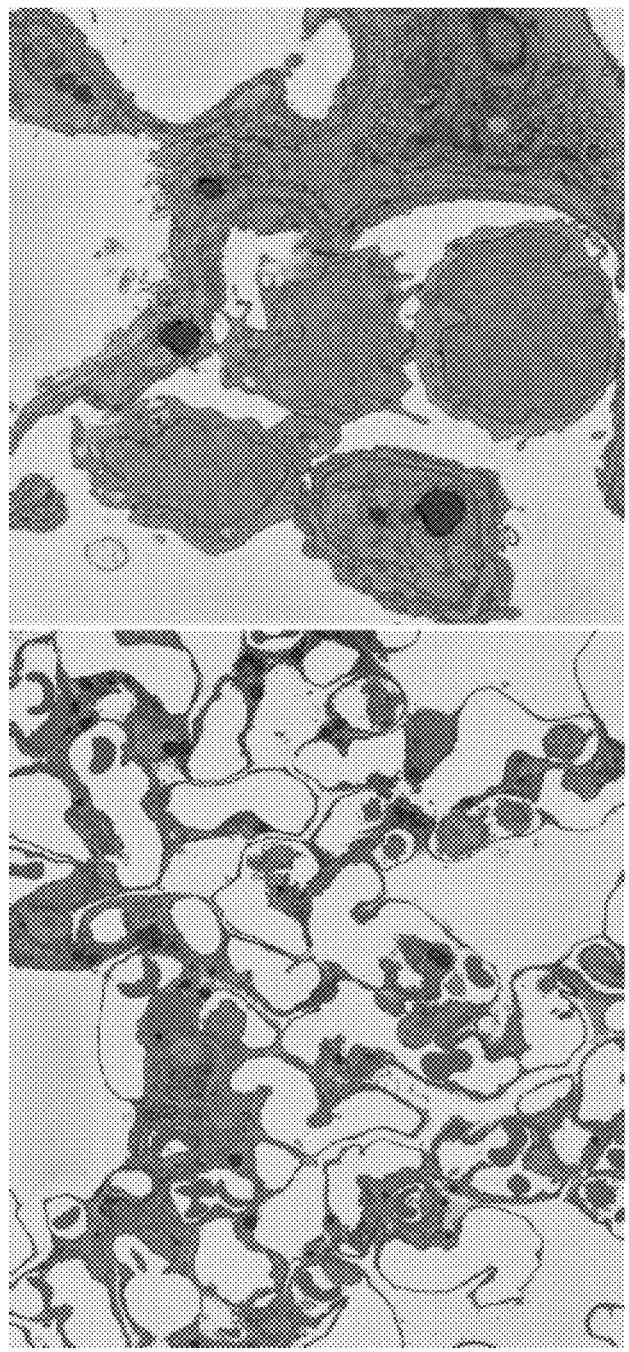

CHARGE-RESISTANT EPOXY RESINS FOR ELECTRON MICROSCOPY APPLICATIONS

PRIORITY CLAIM AND REFERENCE TO RELATED APPLICATION

The application claims priority under 35 U.S.C. § 119 and all applicable statutes and treaties from prior United States provisional application Ser. No. 63/014,865, which was filed Apr. 24, 2020.

STATEMENT OF GOVERNMENT INTEREST

This invention was made with government support from GM103412 awarded by the National Institutes of Health. The government has certain rights in the invention.

FIELD

A field of the invention is epoxy resins, water or other materials used for embedding of samples for electron microscopy (EM), particularly demonstrated in the context of serial block face scanning electron microscopy (SBEM) but also applicable to other techniques (including both ultramicrotome and FIB-SEM (focus ion beam scanning electron microscopy methods), with applications to transmission electron microscopy (TEM), STEM (scanning tunneling microscopy) and cryo-EM (cryo-electron microscopy).

BACKGROUND

In both TEM and STEM processes in a scanning electron microscope, specimens are supported by embedding them typically within a hardened epoxy resin, but also in wax, frozen in pure water or mixtures of water and sucrose. In the instance of an epoxy resin embedding, the specimen supported within the resin can then be sectioned to enable examination of areas of interest, such as the internal structure of a cell. In TEM, multiple sections can be cut from the block and imaged separately. In the scanning electron microscope, the block containing an embedded specimen can be scanned at its uppermost surface (block face). An integrated ultramicrotome, ion beam or gas cluster can then be used to remove a thin layer of embedding matrix and specimen, allowing for a successive scan of the block face, which is repeated until a volumetric expanse of tissue is imaged.

In SEM applications, a limiting problem with the resins used for embedding the specimen is the tendency of the resin to retain charge during exposure to the electron beam, due to the imbalance between the electrons entering specimen and the electrons leaving the specimen. Such charge accumulation introduces localized distortions in the image and can dramatically diminish resolution.

Typically, cells and tissues are intensely heavy-metal stained in order to improve backscattered electron yield at low accelerating voltages and to reduce specimen charging (Deerinck T J, et al, "Enhancing serial block-face scanning electron microscopy to enable high resolution 3-D nanohistology of cells and tissues," Microsc. Microanal. 16, 1138-1139 (2010)). However, not all specimen charging can be eliminated in charge-probe samples such as those containing large open spaces (i.e. lung, kidney and liver tissue) or with low lipid content (muscle, bone, plant, etc.), where the concentration of heavy metal stain is very minimal Most commonly, variable-pressure SEM (VP-SEM) is used for many specimens to minimize charging, but at a significant loss of signal-to-noise and resolution owing to electron-gas interactions. See, Titze B and Denk W, "Automated in-chamber specimen coating for serial block-face electron microscopy," J. Microsc. 250, 101-110 (2013).

Another approach to mitigate specimen charging in SEM uses focal charge compensation (FCC) by injection of nitrogen gas over the block face surface, neutralizing charging in a manner similar to VP-SEM, but without the substantial loss of signal-to-noise and spatial resolution because the overall chamber pressure is at high vacuum. See, Deerinck T J, et al., "High-performance serial block-face SEM of nonconductive biological samples enabled by focal gas injection-based charge compensation," J Microsc. Dec 1 (2017). While this is a powerful tool to minimize charging at high vacuum, it is not available for implementation on all SEM systems.

A better generalizable approach than the charge mitigation techniques discussed above would be to provide an embedding matrix that is intrinsically charge-resistant. A few reports have been published on encasing biological samples in either silver colloid before resin embedding (Wanner et al., "Dense E M based reconstruction of the interglomerular projectome in the zebrafish olfactory bulb," Nat Neurosci 19, 816-825 (2016)) or in a resin containing carbon black (Nguyen et al., "Conductive resins improve charging and resolution of acquired images in electron microscopic volume imaging," Sci Rep. March 29; 6:23721 (2016)) to reduce charging. However, both of these approaches have important drawbacks, including making the specimen optically opaque, and since neither can penetrate into cells and tissues, they are of only modestly effective for serial block face SEM applications.

Polyethylene glycol (PEG) is typically used as a medication. It is in a class of medications called osmotic laxatives. It works by causing water to be retained with the stool. This increases the number of bowel movements and softens the stool. PEG is a water-soluble compound that is used in a wide variety of industrial applications, including the pharmaceutical industry and is the main ingredient in MiraLAX, a common colonoscopy prep solution. It has even been used as an alternative to epoxy resin for stabilizing samples for sectioning for transmission electron microscopy. See, Wolosewick J J., The application of polyethylene glycol (PEG) to electron microscopy," J Cell Biol. Aug; 86(2):675-61 (1980). The Wolosewick publication describes a technique in which cut sections are subsequently stabilized on Formvar/carbon grids and the PEG is removed prior to EM imaging.

SUMMARY OF THE INVENTION

An embodiment of the invention is an epoxy resin-based embedding media doped with a non-conductive dopant to a predetermined w/w % such that the media is non-charging at 1.8 keV. A preferred dopant is polyethylene glycol at a molecular weight of at least 3350, and having a predetermined w/w % is at least 2% and up to 20%, most preferably from 2% to 10%. Another preferred dopant is polyethylene glycol at a molecular weight of 7000-8000 and a predetermined w/w % of up to ~40% and more preferably of up to ~30%.

BRIEF DESCRIPTION OF THE DRAWINGS

FIGS. 2A and 2B are block face SEM images of lung tissue embedded in 100% PEG 3350 and imaged at 2.5 keV;

DETAILED DESCRIPTION OF THE PREFERRED EMBODIMENTS

Figures 1A, 1B:
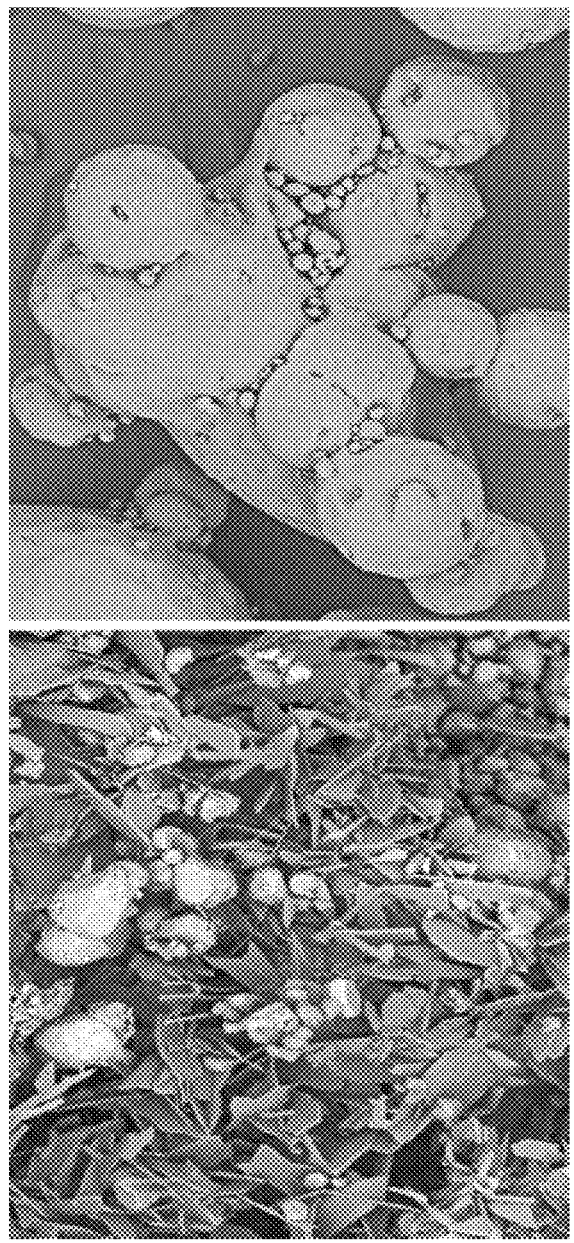
FIGS. 1A and 1B are respective images uncoated magnesium oxide and PEG 3350 taken at 3.0 keV accelerating voltage and high vacuum.
Figure 3C:
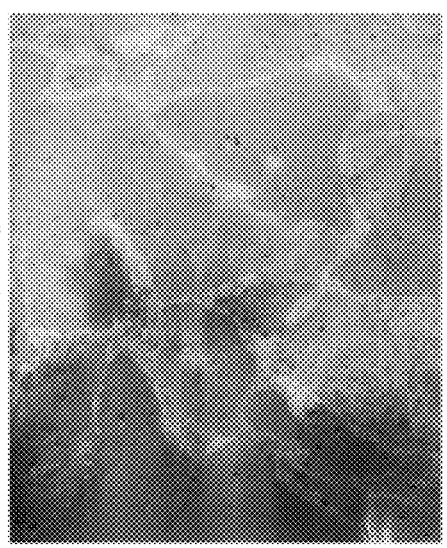
FIGS. 3A-3D compare results for block face imaging of cultured HeLa cells with either undoped Durcupan™ resin (FIGS. 3A and 3B), or 10% PEG 3350-doped Durcupan™ resin (FIGS. 3C and 3D) resin at two different accelerating voltages at high vacuum.
Figure 3D:
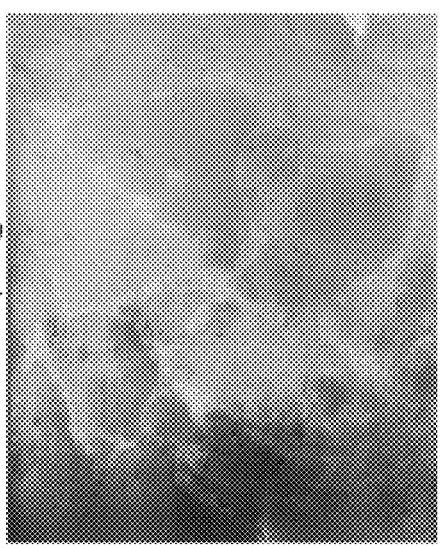
Figure 3A:
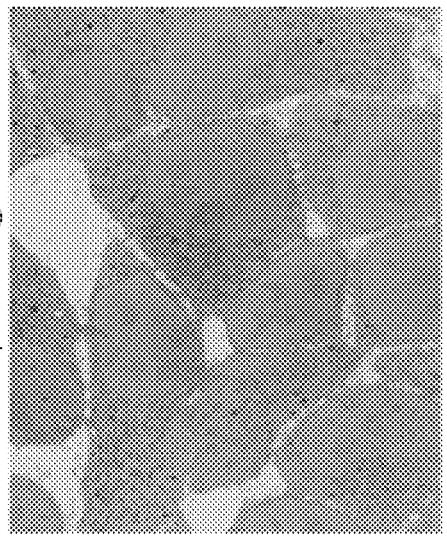
Figure 3B:
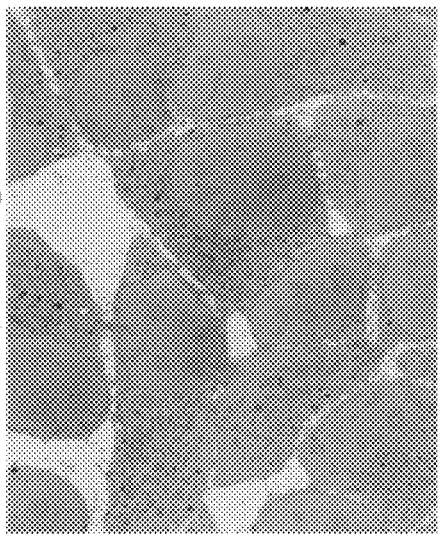

Preferred embodiment resin formulations and specimen embedding methods embed a specimen in a resin that is not electrically conductive, and have the property of not charging at 1-1.8 keV, preferably at 1-2.0 or 1-3.0 keV. Preferred embodiments use PEG of a predetermined molecular weight range as a dopant in predetermined percentage range in an epoxy based resin.

Preferred embodiment resin formulations and specimen embedding methods are believed to be a first employment of PEG during scanning electron microscopy to embed a specimen, with the beneficial effect of charge accumulation avoidance and the resultant increase in resolution. PEG-epoxy resin formulations for specimen embedding during scanning electron microscopy have not been previously reported, to the knowledge of the inventors. Preferred embodiments provide specific resin specimen embedding with optimized PEG molecular weights that reduce charging and thereby provide higher resolution imaging.

A preferred embodiment is a PEG-epoxy resin formulation with polyethylene glycol at a molecular weight of at least 2500, preferably at least 3350 and more preferably at a molecular weight of 8000 (PEG 8000). The w/w percentage is set at a level that provides sufficient clarity and hardness for the type of imaging being conducted. Higher molecular weights permit higher weight percentages of dopant. For example, with PEG at a w/w % of 3350, the maximum preferred w/w % is 15%, while the preferred w/w % at PEG 8000 is 30%. The inventors discovered the surprising result that PEG with a molecular weight of as low as 2500 and particularly at least 3350 reduces the tendency of an epoxy resin to charge under the primary electron beam over a range of accelerating voltages. The optimal molecular weight of PEG, its corresponding state of matter, its concentration vs. epoxy, and the manner in which samples are infiltrated and the formulation is cured during the embedding process, have been determined so as to maximize both charge resistance and cutability for thin sectioning.

Specimen charging in SEM usually occurs when electrons build up on the specimen surface and electrostatically interfere with the imaging electrons. We discovered that the compound polyethylene glycol (at a molecular weight of at least 3350) does not exhibit charging at the voltages routinely used for SBEM (1-3 keV). PEG 3350-8000 are a liquid/melted solid at 56° C., which makes them compatible with normal infiltration and embedding protocols. While PEG is not electrically conductive, it has the anomalous property of not charging at 1-3 keV, most likely due to the ejection of secondary electrons from the sample elicited by the primary electron beam in great enough number to balance the overall charge, referred to as charge balance. This property was recognized outside the context of a resin for pure PEG. (Tang and Joy, "Quantitative measurements of charging in a gaseous environment.," Scanning July-August; 25(4):194-200 (2003)). There are other non-conductive materials that have a similar behavior, including magnesium oxide.

We also determined that preferred PEG-epoxy formulations having a molecular weight of at least 3350 have a larger mean-free path for inelastic scattering vs. pure epoxy at 300 keV. This will be advantageous for TEM, particularly for spectroscopic methods, facilitate higher contrast imaging of thick samples, and, as an additive to ddH$_2$O, enhance cryoEM performance, by reducing charging and reducing beam-induced damage.

Experiments

FIGS. 1A and 1B are respective images of uncoated magnesium oxide and PEG 3350 taken at 3.0 keV accelerating voltage and high vacuum (between $10^{-3}$ and $10^{-7}$ mBarr). Though both materials are not electrically conductive, no charging was observed in this experiment.

FIGS. 2A and 2B are block face SEM images of lung tissue embedded in 100% PEG 3350 and imaged at 2.5 keV. No charging is visible, even in areas of bare PEG. While pure PEG 3350 guards against charging, it lacks performance of common SBEM resins (Durcupan™ ACM resin, Fluka), both in terms of beam tolerance and ability to section (ability to remove a layer having a thickness of ~50 to 100 nm. For these reasons, we tested PEG 3350 as a dopant for conventional resins to test levels of PEG 3350 that could raise its charge-balance point and improve its charge-resistance. The goal was to create a resin with all the positive attributes of epoxy resin (transparent, sections well, beam tolerant, penetrates uniformly into cells and tissues), but is resistant to charging. PEG 3350 is a solid at room temperature and is soluble in all percentages in epoxy resin, so we began by testing 2, 5, 10, 15 and 20% (w/w) PEG in Durcupan™ resin, while any conventional and commercially available epoxy resin-based embedding media is suitable. After polymerization, bulk blocks were tested for mechanical strength and sectioning properties of the resin. The data is provided in Table 1:

TABLE 1

| Concentration (w/w) | Appearance | Mechanical Properties | Bulk Charging at 2 keV |
|---|---|---|---|
| 2% | clear | hard | some |
| 5% | clear | hard | some |
| 10% | clear | hard | slight |
| 15% | slightly opaque at room temp | medium | almost none |
| 20% | Slightly opaque at room temp | soft | none |

In the above bulk charging column, the characterizations correspond to the following approximations. Some—>10% of imaging area affected. Slight—<10% of imaging area affected. Almost none—<1% of imaging area affected. None—0% of imaging area affected. In the above mechanical properties column, the designations of hard indicated that properties were comparable to the original resin. The medium designation was softer but suitable for imaging with sectioning, and the "soft" designation is poor for applications requiring sectioning. The different doped resins were placed in the SEM and imaged at a variety of accelerating voltages (1-5 keV) at high vacuum. When compared to undoped resin that shows significant charging at all voltages above 1.0 keV, with the 2% doped resin only modest charging was observed and at 20% almost no charging was observed up to 2.0 keV. However, the 20% resin had the disadvantage of being soft in consistency and therefore inferior in its sectioning properties. It also became slightly opaque if allowed to cool to room temperature, complicating the infiltration and embedding protocol.

Figures 4A, 4B:
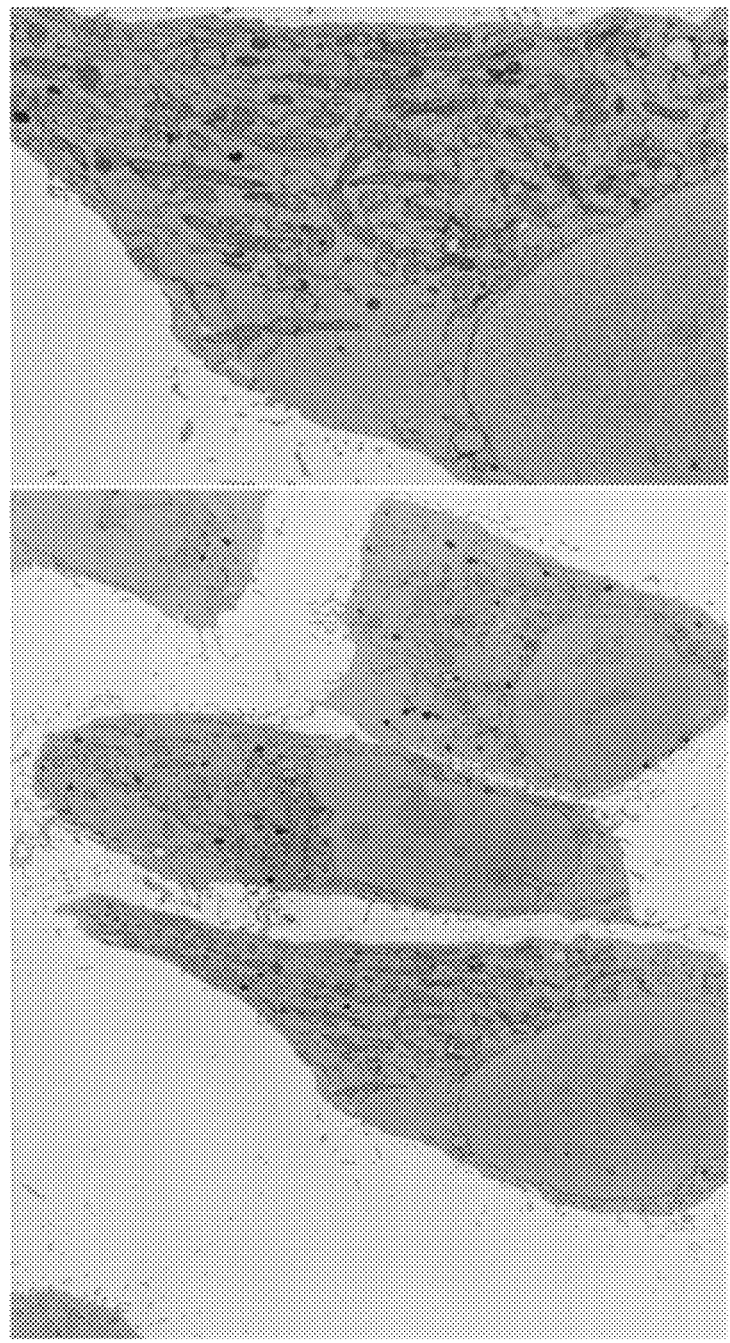
FIGS. 4A and 4B are block face images of cultured HeLa cells using 10% doped resin at 1.4 keV accelerating voltage and high vacuum.

FIGS. 3A-3D compare results for block face imaging of cultured HeLa cells with either undoped Durcupan™ resin (FIGS. 3A and 3B), or 10% PEG 3350-doped Durcupan™ resin (FIGS. 3C and 3D) resin at two different accelerating voltages at high vacuum. FIGS. 4A and 4B are block face images of cultured HeLa cells using 10% doped resin at 1.4 keV accelerating voltage and high vacuum. No specimen charging is observed, even in regions of bare resin.

In direct comparison using parallel-processed samples and identical imaging parameters (Zeiss Merlin FE-SEM, ~80 pA probe current, HR mode, 8 k×12 k raster with 1 µsec dwell time, 6.0 mm WD, 1730× magnification, chamber vacuum ~$1\times10^-$limbar, we found a significant improvement in charge-resistance in the doped resin. While moderate charging was noted at 2.0 keV, almost no charging was observed at 1.4 and 1.5 keV in the doped resin (FIGS. 3C-4B). The undoped resin in contrast showed significant charging at any voltage above 1.0 keV. The sectionability of the doped resin was comparable to undoped resin when polymerized at 90° C. for 24 hours and remained glassy-clear and otherwise indistinguishable from undoped resin.

Figures 5A, 5B:
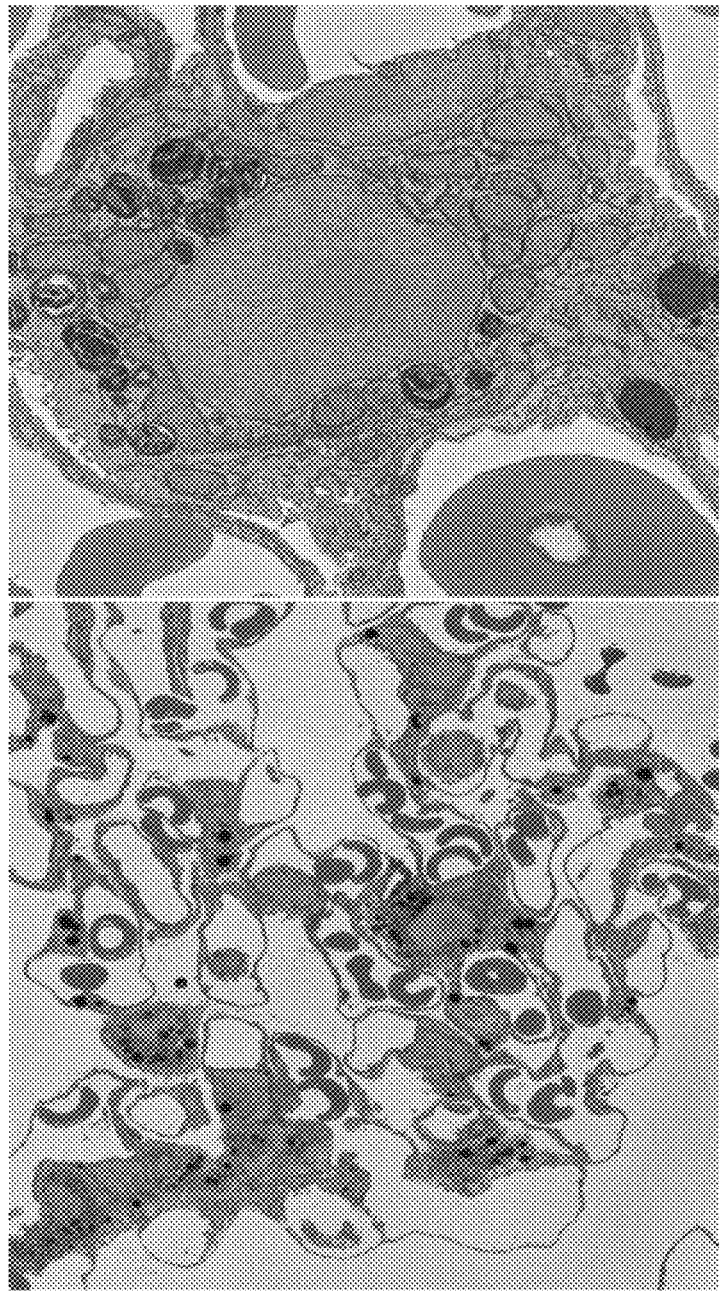
FIGS. 5A and 5B are block face images of lung tissue embedded in 10% 3350 PEG doped resin and imaged at 1.8 keV and at high vacuum

FIGS. 5A and 5B are block face images of lung tissue embedded in 10% 3350 PEG doped resin and imaged at 1.8 keV and at high vacuum. Specimens that were conventionally fixed and prepared using the OTO procedure and en bloc uranyl acetate treatment (the same used for the HeLa cells) were embedded in the 10% doped resin and cured at 90° C. for 24 hours. We found that at 2.0 keV some specimen charging was noted in the lung tissue but at 1.8 keV essentially no charging was observed. For a preferred PEG 8000 doping of 30%, no charging was observed up to 300 keV.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. An electron microscopy specimen mounting, comprising an epoxy resin-based embedding media doped with a polyethylene glycol dopant to a w/w % of 2% to 40% such that the media is non-charging at at least 1.8 keV.

2. The mounting of claim 1, wherein the polyethylene glycol dopant has a molecular weight of at least 3350.

3. The mounting of claim 1, wherein the w/w % is 2% to 10%.

4. The mounting of claim 1, wherein the w/w % is 2% to 20%.

5. The mounting of claim 1, having a sample embedded therein.

6. The mounting of claim 1, comprising 30-40% w/w polyethylene glycol at a molecular weight of 7000-8000.

7. The mounting of claim 6, comprising ~30% w/w polyethylene glycol.

8. The mounting of claim 1, wherein the polyethylene glycol dopant has a molecular weight of ~8000 and the w/w % is ~30%.

9. A method for conducting SEM, the method comprising preparing a specimen in the mounting of claim 1 and conducting imaging.

10. The method of claim 9, comprising conducting a series of imaging scans with layers of the specimen being removed between scans.

* * * * *